United States Patent [19]

Ohachi

[11] Patent Number: 5,104,702

[45] Date of Patent: Apr. 14, 1992

[54] BLOOD PLATELET PRESERVING CONTAINER AND METHOD FOR PRODUCTION THEREOF

[75] Inventor: Yoshinori Ohachi, Fujinomiya, Japan

[73] Assignee: Terumo Kabushiki Kaisha, Tokyo, Japan

[21] Appl. No.: 426,076

[22] Filed: Oct. 24, 1989

[30] Foreign Application Priority Data

Oct. 25, 1988 [JP] Japan .................. 63-267158

[51] Int. Cl.$^5$ .................. B65D 30/02; B01L 3/00; C08L 27/06
[52] U.S. Cl. .................. 428/354; 525/239; 422/102; 428/36.6
[58] Field of Search .................. 525/239; 428/35.4; 422/102

[56] References Cited

U.S. PATENT DOCUMENTS

| | | | |
|---|---|---|---|
| 3,796,776 | 3/1974 | Ide et al. .................. | 525/239 |
| 4,337,768 | 7/1982 | Hatada et al. .................. | 428/35.4 |
| 4,657,541 | 4/1987 | Ichikawa et al. .................. | 428/36.6 |
| 4,914,154 | 4/1990 | Haller et al. .................. | 525/239 |

FOREIGN PATENT DOCUMENTS 55-078045 6/1980 Japan .................. 525/239

*Primary Examiner*—Carman J. Seccuro
*Attorney, Agent, or Firm*—Burns, Doane, Swecker & Mathis

[57] ABSTRACT

A blood platelet preserving container formed of a flexible vinyl chloride resin composition containing 1 to 30% by weight, based on the total amount of vinyl chloride resin component, of cross-linked vinyl chloride resin particles having an average diameter in the range of 2 to 30 μm and provided on the inner wall surface thereof with minute protuberances, and a method thereof.

8 Claims, 1 Drawing Sheet

BLOOD PLATELET PRESERVING CONTAINER AND METHOD FOR PRODUCTION THEREOF

BACKGROUND OF THE INVENTION

1. Field of the Invention

This invention relates to a blood platelet preserving container and a method for the production thereof. More particularly, it relates to a blood platelet preserving container excelling in the blood platelet preserving ability and having no use for any embossing treatment and a method for the production thereof.

2. Description of the Prior Art

Generally, the inner sheet surface of a blood platelet preserving container is required to be as flat and smooth as permissible and for the purpose of ensuring favorable preservation of blood platelets and, at the same time, to be embossed for the purpose of preventing the sheet from blocking during the course of sterilization. In the production of a flat and smooth embossed sheet meeting the requirement, the operation of passing a blank sheet between the pressing surfaces of embossing rolls by the T-die extrusion molding or calendering process has been utilized during the molding of molten sheet into a sheet [Japanese Patent Laid-Open SHO 60(1985)-246,757 and Japanese Patent Publication SHO 57(1982)-6,946].

The embossing rolls which are required for the embossing treatment of this nature, however, are very expensive and necessitate a surface formed of a soft metal such as copper for the purpose of permitting impartation of an accurate shape. The surface of such a metal is liable to sustain a flaw readily. Even a slight injury impairs the surface condition of the produced sheet and exerts an adverse effect on the blood platelet preserving property. Thus, the product lacks uniformity of quality. The embossing rolls, therefore, must be renewed often, a fact which constitutes a serious economic drawback.

Further, since the sheet is passed between the pressing surfaces of rolls, it generates static electricity and consequently attracts dust, dirt, etc. and opens up the possibility of entraining foreign matter, the most serious problem for such medical containers as blood platelet bags.

Lusterless shaped articles produced by the embossing process are disclosed in Japanese Patent Laid-Open SHO 58(1983)-33,426, Japanese Patent Laid-Open SHO 58(1983)-152,040, Japanese Patent Laid-Open SHO 54(1979)-163,939, Japanese Patent Laid-Open SHO 56(1981)-142,025, Japanese Patent Laid-Open SHO 56(1981)-11,916, and Japanese Patent Laid-Open SHO 58(1983)-160,337, for example. A similar lusterless shaped article by the tubular film process for which the embossing rolls are unfit is obtained by cooling the die of a molding machine and the mandrel part as disclosed in Japanese Patent Laid-Open SHO 62(1987)-19,431. This method is generally adopted as means of preventing the phenomenon of blocking and improving the slipping property. Since these lusterless shaped articles have rough surfaces on the embosses embossed side, however, they have been generally regarded heretofore as unfit for preserving containers of blood, particularly blood platelets [as indicated in Japanese Patent Laid-Open SHO 54(1979)-86,967 and Cryogenic Medicine, Vol. 4, No. 1, pages 9-15 (1978)].

The idea of using a flexible vinyl chloride resin composition containing cross-linked vinyl chloride resin particles as medical materials is disclosed in Japanese Patent Laid-Open SHO 59(1984)-166,161 and U.S. Pat. No. 4,657,541, for example. It is intended exclusively for medical materials of the ordinary grade. The inventions do not specify this composition as to the particle diameter, the amount of addition, and other conditions of the crosslinked vinyl chloride resin particles in due consideration of their effects on the blood platelets.

An object of this invention, therefore, is to provide a novel blood platelet preserving container and a method for the production thereof.

Another object of this invention is to provide an economically excellent blood platelet preserving container endowed with a satisfactory surface property excelling in the blood platelet preserving ability by the molding process having no use for any expensive embossing rolls and having no possibility of entraining foreign particles and producing no adverse effects on the preservation of blood platelets and a method for the production thereof.

SUMMARY OF THE INVENTION

The objects described above are accomplished by a blood platelet preserving container formed of a flexible vinyl chloride resin composition containing 1 to 30% by weight, based on the total amount of vinyl chloride resin component, of cross-linked vinyl chloride resin particles having an average diameter in the range of 2 to 30 $\mu$m and provided on the inner wall surface thereof with minute protuberances.

This invention further discloses a blood platelet preserving container whose inner wall surface is substantially rough in a 100-magnification SEM (scanning electron microscope) picture image and substantially flat and smooth in a 3,000-magnification SEM picture image and whose inner wall surface roughness, $R_{max}$ (DIN Standard), is in the range of 5 to 30 $\mu$m. This invention also discloses a blood platelet preserving container whose inner wall surface roughness is such that the ratio of $(Rz_{max} - Rz_{min})/Rz_{max}$ expressed with the values determined by the DIN Standard 4768 is not more than 50%.

The objects are further accomplished by a method for the production of a blood platelet preserving container, which method comprises molding a flexible vinyl chloride resin composition containing 1 to 30% by weight, based on the total amount of vinyl chloride resin component, of cross-linked vinyl chloride resin particles having an average diameter in the range of 2 to 30 $\mu$m by inflation process or blow molding process into a container and forming minute protuberances on the inner wall surface of the container.

In the case of a blood platelet preserving bag, the inner sheet surface must be endowed with a specular effect for the purpose of preventing entrainment of foreign particles and, at the same time, enhancing the blood platelet preserving ability and the inner sheet surface must be capable of precluding the phenomenon of blocking during the course of sterilization.

A diligent study continued in search of a method capable of producing a sheet possessing such characteristic properties as ideal for preservation of blood platelets has led to a knowledge that by molding a flexible vinyl chloride resin composition containing 1 to 30% by weight, based on the total amount of vinyl chloride resin component, of cross-linked vinyl chloride resin particles having an average diameter in the range of 2 to 30 μm, there can be obtained a blood platelet preserving sheet whose inner wall surface is allowed to acquire minute protuberances due to the prominence of cross-linked polyvinyl chloride particles of the prescribed size and consequently endowed with the aforementioned characteristic inner surface properties. On the basis of this knowledge, the present invention provides the blood platelet preserving container and the method for the production thereof.

The technique underlying this invention is particularly effective in enhancing the film container's ability to preserve blood platelets in a great measure. To be specific, when a blood platelet container is made of a sheet obtained by molding by the inflation (tubular film) process, for example, a flexible vinyl chloride resin composition containing cross-linked polyvinyl chloride resin particles of a prescribed size in a prescribed ratio, the produced container exhibits a notably high blood platelet preserving ability and, therefore, fits practical utility for the preservation of blood platelets.

A vinyl chloride is polymerized in the presence of a cross-linking agent so as to form cross-linked vinyl chloride resin particles having an average diameter in the range of 2 to 30 μm. A flexible vinyl chloride resin composition containing 1 to 30% by weight, based on the total amount of vinyl chloride resin component, of the cross-linked vinyl chloride resin particles is molded by the tubular film process or the blow molding process to produce a vinyl chloride sheet. This sheet is fabricated to produce a bag of a desired shape. Thus, a blood platelet preserving bag is produced which precludes otherwise possible entrainment of foreign particles and combines a specular effect with a highly desirable blood platelet preserving ability.

EXPLANATION OF THE PREFERRED EMBODIMENT

Figure 2:
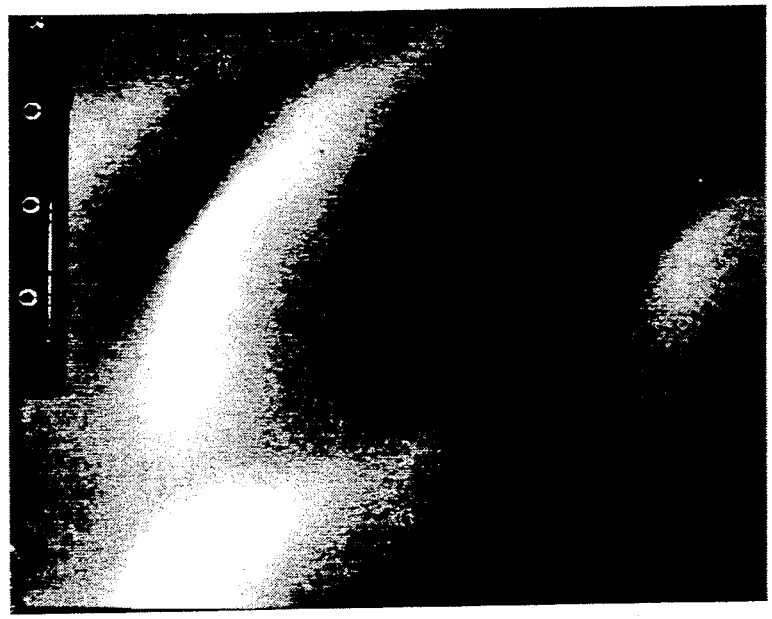
FIG. 2 is a 3,000-magnification SEM picture image illustrating the same surface condition (protuberant structure).

A blood platelet preserving bag made of a sheet obtained by molding by the inflation (tubular film) process a flexible vinyl chloride resin composition containing 1 to 30% by weight, based on the total amount of vinyl chloride resin component, of cross-linked vinyl chloride resin particles having an average diameter in the range of 2 to 30 μm is favorably comparable in blood platelet preserving ability with a blood bag possessing a specular sheet surface. This bag exhibits much better resistance to the phenomenon of blocking during the course of sterilization than the blood bag possessing the specular sheet surface. For the purpose of imparting the characteristic properties mentioned above, namely, for the purpose of producing a satisfactory blood platelet preserving ability, the cross-linked polyvinyl chloride resin particles must possess an average diameter in the range of 2 to 30 μm. If the average particle diameter is less than 2 μm, the surface lacks roughness and approximates a specular state and fails to give rise to the resistance to the phenomenon of blocking during the course of sterilization. Conversely, if the diameter exceeds 30 μm, the blood platelet bag produced by fabricating by the tubular film process or the blow molding process a sheet of a thickness of 300 to 500 μm suitable for the purpose of the bag sometimes if not always suffers from an inferior blood platelet preserving ability because of the possibility that the uncross-linked polyvinyl chloride resin will fail to cover completely the cross-linked polyvinyl chloride resin particles and, therefore, the cross-linked polyvinyl chloride resin particles themselves will appear to the sheet surface, disrupt the specular effect, and manifest themselves as a part destitute of flatness and smoothness. Preferably, the average diameter of the cross-linked polyvinyl chloride resin particles is in the range of 3 to 20 μm, preferably 5 to 18 μm. Not all of the resin particles are required to fall exactly within the range. For this invention, it suffices that the resin particles fall substantially within this range.

Further, the roughness of the inner sheet surface, as determined in terms of $R_{max}$ specified by the DIN Standard 4768, is in the range of 5 to 30 μm, preferably 10 to 25 μm. If this roughness is less than 5 μm, the phenomenon of blocking occurs during the course of sterilization and the sterilization consequently becomes substantially impracticable. If the roughness exceeds 30 μm, the possibility of the blood platelets readily undergoing coagulation and inducing the occurrence of inferior coagulation will be furthered. For the sake of the blood platelet preserving bag, it is advantageous that the ratio (DRz) of the difference between the mximum value ($Rz_{max}$) and the minimum value ($Rz_{min}$) to the maximum value ($Rz_{max}$) as determined at $R_z$, one of the points dividing the sheet into eight equal parts in the direction of TD (namely, the direction perpendicular to the direction of molding of the sheet) under the conditions of 0.25 mm of cutoff value, 0.8 mm of standard length, and 4.0 mm of measuring length specified by the DIN Standard 4768 is not more than 30%, preferably not more than 20%. Generally, when a sheet is embossed by the tubular film process as disclosed in EP-A 0 210 108, it occurs sometimes if not always that the uniformity of embossing is degraded in the direction of TD and the ratio, DRz increases past 30%, rendering it diffcult to obtain uniform embossing. Thus, there arises the possibility that the portions of a small value of $R_z$ will induce the phenomenon of blocking during the treatment for sterilization and the portions of a large value of $R_z$ will impair the preservability of blood platelets.

Only when a polyvinyl chloride resin containing cross-linked polyvinyl chloride resin particles as described above, it is enabled to produce a blood platelet preserving container (bag) excellent in the ability to preserve blood platelets by a molding process which has no possibility of entraining foreign particles during the course of molding by the tubular film process or blow molding process and has no used for any expensive embossing rolls.

For the purpose of this invention, it is advantageous that the cross-linked polyvinyl chloride resin particles are contained in a ratio in the range of 1 to 30% by weight, preferably 2 to 10% by weight, in the vinyl chloride resin composition destined to form a sheet. If this ratio is less than 1% by weight, the resistance to the phenomenon of blocking during the course of sterilization is not sufficient. If the ratio exceeds 30% by weight, the molding of the resin composition into a sheet becomes difficult. The content of cross-linked polyvinyl chloride resin particles in the resin composition of this invention is expressed by the value to be determined as the proportion in weight of the portion remaining undissolved when the resin composition is dissolved with such a solvent as tetrahydrofuran (THF), for example.

The cross-linked vinyl chloride resin particles thus contained in the resin composition, as well known in the art, comprise a vinyl chloride monomer or the vinyl chloride monomer combined with a comonomer copolymerizable therewith, and a polyfunctional compound possessing at least two ethylenic double bonds within the molecular unit thereof. When the resin composition is dissolved in tetrahydrofuran, therefore, these resin particles remain intact.

The cross-linked vinyl chloride resin particles possessing average diameters fit for use in the present invention include the products of Chisso Corporation. marketed under product codes of SD10X (10 to 15 $\mu$m), SD7E, CD10, CD18K, CD21, CD21K, CD25, and CD25K, the products of Shin-etsu Chemical Industry Co., Ltd. marketed under product codes of GR-800S, GR-1200, GR-1300S, and GR-2500S, and the products of Mitsui-Toatsu Chemical Industry Co., Ltd. marketed under trademark designations of Vinychlon DR-M and vinychlon DR-M-3, for example. These commercial products are designated as partially cross-linked polyvinyl chloride resins and partly contain cross-lined chloride resin particles fit for use in this invention.

By combining a polyvinyl chloride composition containing these cross-linked vinyl chloride particles with a suitable amount of a vinyl chloride composition having no cross linking, there can be prepared a vinyl chloride composition containing cross-linked vinyl chloride particles in a ratio falling in the range contemplated by this invention.

Examples of the vinyl chloride resin having no cross linking usable for incorporation in the flexible vinyl chloride resin composition include homopolymer of vinyl chloride, polyvinylidene chloride, and copolymers of not less than 50% by weight, preferably not less than 60% by weight, and most preferably not less than 80% by weight, of vinyl chloride with other copolymerizable comonomer. The average polymerization degree of the vinyl chloride resin is in the range of 700 to 3,000, preferably 1,000 to 2,000. The comonomers usable for copolymerization with vinyl chloride include vinylidene chloride, ethylene, propylene, vinyl acetate, vinyl fluoride, styrene, vinyl toluene, vinyl pyridine, alkyl acrylates (such as, for example methyl acrylate, ethyl acrylate, isopropyl acrylate, n-butyl acrylate, and 2-ethylhexyl acrylate), and alkyl methacrylates (such as, for example, methyl methacrylate, ethyl methacrylate, and 2-ethylhexyl methacrylate).

The plasticizers which are usable for incorporation in the flexible vinyl chloride resin composition destined to form the blood platelet preserving container of this invention include phthalic esters such as dihexyl phthalate (DHP), di-2-ethylhexyl phthalate (DOP), di-n-octyl phthalate (DNOP), diisooctyl phthalate (DIOP), diheptyl phthalate, didecyl phthalate (DDP), diisodecyl phthalate (DIDP), and octyl decyl phthalate, trimellitic esters such as tributyl timellitate and trioctyl trimellitate, aliphatic polybasic esters such as dioctyl adipate (DOA), dioctyl azelate (DOZ), and dioctyl sebacate (DOS), and citric esters such as tributyl acetyl citrate, trioctyl acetyl citrate, and tributyl citrate which are invariably usable generally for vinyl chloride resins. Among other plasticizers mentioned above, dialkyl phthalates (having 6 to 13 carbon atoms in the alkyl groups thereof) prove to be particularly preferable. If the alkyl group of the plasticizer to be used has not more than 6 carbon atoms, this plasticizer offers a problem in terms of safety. If the alkyl group has not less than 13 carbon atoms, the plasticizer possesses inferior miscibility with the vinyl chloride resin. From the viewpoint of safety, the alkyl group is preferable to be in a linear structure. The alkyl groups to be involved need not be identical with one another. The plasticizer may be the ester of a mixture of alcohols having different chain lengths.

The amount of the plasticizer to be incorporated in the resin composition is in the range of 20 to 100 parts by weight, preferable 30 to 70 parts by weight, based on 100 parts by weight of the vinyl chloride resin having no cross-linking. The other additives which can be contained in the flexible vinyl chloride resin composition include such metal soaps of calcium and zinc with stearic acid, laurylic acid, ricinolic acid, and naphthelic acid, epoxidized animal and vegetable oils such as epoxidized soybean oil and epoxidized linseed oil, slip additives, and antioxidants, for example. As the plasticizer mentioned above, the conventional plasticizer made of a high molecular polymer such as, for example, a thermoplastic polyurethane resin may be used by the polymer blend process.

The blood platelet preserving container contemplated by the present invention is produced by processing the vinyl chloride resin composition described above by the use of a film molding device in popular use. By the tubular film process, for example, the film is obtained by supplying the resin composition prepared through a hopper, thoroughly and uniformly melting and kneading the resin composition, extruding the melt through the die of an extrusion molding device, inflating the extruded tube of the molten resin with a forced current of air, cooling and solidifying the inflated tube with a current of cooling air, and taking up the cooled tube on a lifting and winding device. Further, in accordance with the present invention, the sheet can be formed by the extrusion molding process or the blow molding process. The sheet thus obtained is cut to a prescribed shape and folded with the matched edges sealed with a high-frequency welder, to give rise to a blood platelet preserving container. In this case, the thickness of the sheet is in the range of 0.1 to 0.6 mm, preferably 0.2 to 0.4 mm.

When the blood platelet preserving container is made of the flexible polyvinyl chloride resin composition incorporating therein in a prescribed ratio the cross-linked vinyl chloride resin particles possessing a specific average diameter, the inner wall of the container acquires a substantially embossed surface. This inner surface has roughness of the degree obtainable by specular finishing. The surface roughness is such that the ratio of $(Rz_{max} - Rz_{min})/Rz_{max}$ as expressed with the values determined as specified by the DIN Standard 4768 is not more than 50%. The blood platelet preserving container consequently obtained has no possibility of entraining any foreign particles, precludes the occurrence of the phenomenon of blocking during the course of sterilization, causes disintegration of blood platelets only sparingly, and possesses a highly desirable preserving ability.

Now, the production of the blood platelet preserving container of this invention will be described below with reference to working examples. It should be noted, however, that this invention is not limited to the following examples.

EXAMPLE 1

A mixture was prepared by combining 25% by weight of a partially cross-linked polyvinyl chloride resin containing about 30% by weight of cross-linked polyvinyl chloride particles of diameters approximately in the range of 5 to 6 μm (produced by Chisso Corporation. and marketed under product code of "SD13E") with 75% by weight of an uncrosslinked polyvinyl chloride resin (produced by Chisso Corporation. and marketed under product code of "KS-1700"). Consequently, there was obtained a polyvinyl chloride resin component containing about 7.5% by weight of cross-linked polyvinyl chloride resin particles having diameters approximately in the range of 5 to 6 μm. A sheet 0.4 mm in thickness was prepared by mixing and kneading 100 parts by weight of the resin component with 50 parts by weight of dioctyl phthalate (DOP) as a plasticizer, 10 parts by weight of epoxidized soybean oil, and 0.1 part by weight of a Ca-Zn type stabilizer, pelletizing the resultant mixture, and molding the pellets by the inflation (tubular film) process. A blood-collecting type blood platelet triple bag having an inner volume of 400 ml was produced by subjecting this sheet to high-frequency fusion. Then, this blood platelet bag was internally wetted with an anticoagulant CPD liquid (a mixed liquid consisting of sodium citrate, citric acid, glucose, and sodium phosphate) and sterilized with high-pressure steam, to obtain a sample.

To test this sample for blood platelet preserving ability, human blood was collected in the sample and subjected to the conventional operation for separation of blood components. Then, the sample which had staged the treatment of blood was tested for blood platelet preserving ability.

The test for blood platelet preserving ability was conducted as follows.

For the evaluation of the blood platelet preserving ability, the amount of β-thromboglobulin released during the disintegration of preserved blood platelet cells (β-TG release) was measured and used as a criterion.

The measurement was made with a β-TG RIA kit (produced by Radiochemical Center, Amersham, England). Freeze dried $^{125}$I-β-TG (human) was dissolved in distilled water. In the meantime, freeze dried anti-human-β-TG blood serum was similarly dissolved in distilled water. Freeze β-TG standard substances were severally dissolved in standard concentrations in distilled water, to obtain standard concentration solutions. In test tubes each having EDTA and theophylline buffer placed in advance therein, the $^{125}$I-β-TG (human) liquid and the anti-human-β-TG blood serum added thereto were stirred for several seconds, the resultant mixture was left standing at normal room temperature for one hour and then stirred for several seconds with ammonium sulfate added thereto, and the resultant mixture was left standing at rest for 10 to 60 minutes, and then subjected to centrifugal sedimentation with 1,500 G at normal room temperature for 20 minutes. The cells in the specimens remaining in the test tubes after removal of supernatants were counted with a δ-scintillation counter. The percents of bound cells in the specimens were calculated by dividing the respective counts with the total count. The β-TG concentrations of the specimens were calculated from a standard curve drawn with the percents of bound cells of standard substances.

The present test was conducted on the sample container after three days' preservation of blood platelets therein. The results were as shown in Table 1.

The blood platelet preserving sheet obtained by this invention was tested for susceptibility of the surface thereof to the phenomenon of blocking during the course of sterilization by the use of an autoclave. The results were as shown in Table 1. The degree of blocking was visually evaluated on the five-point scale, wherein:

0: Perfect absence of blocking; natural opening obtainable by a pull at one end of sheet.
1: Partial local blocking, opening obtainable easily.
2: Partial local blocking, opening obtainable with difficulty.
3: Total blocking, opening obtainable with difficulty. Opening obtained somehow or other results in natural separation of blocked inner surfaces.
4: Total blocking, opening obtainable with difficulty. Opening obtained somehow or other fails to effect separation of blocked inner surfaces.

Figure 1:
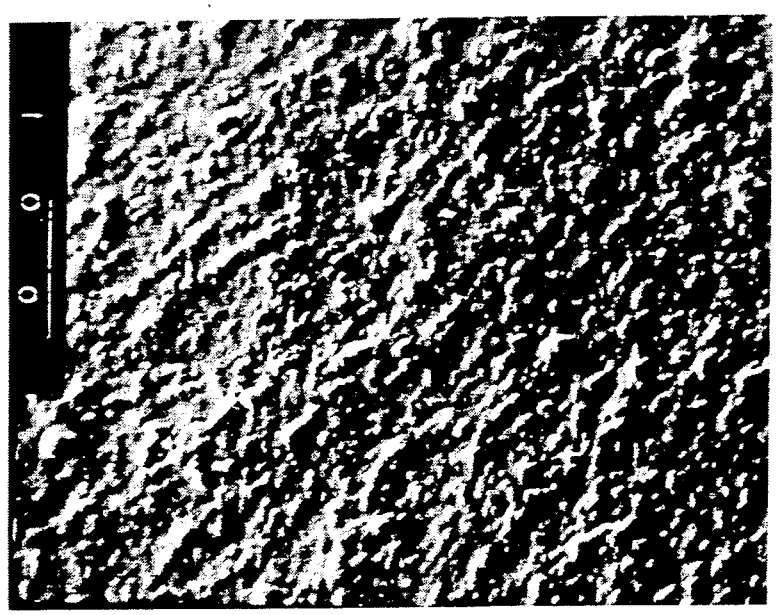
FIG. 1 is a 100-magnification scanning electron micrograph (SEM picture image) illustrating the condition (protuberant structure) of the inner wall surface of a blood platelet preserving container of this invention.

The inner wall surface of the blood platelet preserving container produced in accordance with the present invention was photographed under a scanning electron microscope. A 100-magnification SEM picture image is shown in FIG. 1 and a 3,000-magnification SEM picture image in FIG. 2. The surface roughness, $R_{max}$, of the blood platelet preserving container determined by the DIN Standard was 6 μm. The ratio, $(Rz_{max}-Rz_{min})/Rz_{max}$, of the bag determined by the DIN Standard 4768 was 20%.

CONTROL 1

A 400-ml blood-collecting grade triple bag for comparison was made of a T-die extruded sheet having the inner surface thereof formed with embossing rolls regulated to produce a substantially specular inner surface, using the same raw materials in Example 1 except that 100% by weight of an uncross-linked polyvinyl chloride (produced by Kanegafuchi Chemical Industry Co., Ltd. and marketed under product code of "KS-1700") was used instead. This triple bag was similarly tested for the blood platelet preserving ability. The surface roughness, $R_{max}$, of this triple bag determined by the DIN Standard was 18 μm. The ratio, $(Rz_{max}-Rz_{min})/Rz_{max}$, of the triple bag determined by the DIN Standard 4768 was 19%.

EXAMPLE 2

A mixture was prepared by combining 12.5% by weight of a partially cross-linked polyvinyl chloride resin containing about 30% by weight of cross-linked polyvinyl chloride particles having diameters approximately in the range of 10 to 15 μm (product of Chisso Corporation. marketed under product code of "SD10X") with 87.5% by weight of an uncross-linked polyvinyl chloride resin (product of Kanegafuchi Chemical Industry Co., Ltd. marketed under product code of "KS-1700"). Consequently, there was obtained a polyvinyl chloride resin component containing about 3.8% by weight of cross-linked polyvinyl chloride resin particles of diameters approximately in the range of 10 to 15 μm. A sheet 0.4 mm in thickness was formed by mixing and kneading 100 parts by weight of this resin component with 50 parts by weight of dioctyl phthalate (DOP) as a plasticizer, 10 parts by weight of epoxidized soybean oil, and 0.1 part by weight of a Ca-Zn type stabilizer, pelletizing the resultant mixture, and molding the pellets by the tubular film process. A blood-collecting type blood platelet triple bag having an inner volume of 400 ml was produced by subjecting the film to high-frequency fusion. This blood platelet bag was internally wetted with an anticoagulant PCD liquid (a mixed liquid consisting of sodium citrate, citric acid, grape sugar, and sodium phosphate) and then sterilized with high-pressure steam, to obtain a sample. This sample was tested by following the procedure of Example 1. The surface roughness, $R_{max}$, of the sample determined by the DIN Standard was 14 μm. The ratio, $(Rz_{max}-Rz_{min})/Rz_{max}$, of the sample determined by the DIN Standard 4768 was 17%. The inner wall surface was substantially rough in a 100-magnification SEM picture image and substantially flat and smooth in a 3,000-magnification SEM picture image similarly to Example 1.

CONTROL 2

A mixture was prepared by combining 12.5% by weight of a partially cross-linked polyvinyl chloride resin containing about 50% by weight of cross-linked polyvinyl chloride particles having diameters approximately in the range of 50 to 75 μm (product of Kanegafuchi Chemical Industry Co., Ltd. marketed under product code of "XEL-B") with 87.5% by weight of an uncross-linked polyvinyl chloride resin (product of Kanegafuchi Chemical Industry Co., Ltd. marketed under product code of "KS-1700"). Consequently, there was obtained a polyvinyl chloride resin composition containing about 6.3% by weight of cross-linked polyvinyl chloride resin particules of diameters approximately in the range of 50 to 75 μm. A sheet 0.4 mm in thickness was formed by mixing and kneading 100 parts by weight of the resin component with 50 parts by weight of dioctyl phthalate (DOP) as a plasticizer, 10 parts by weight of epoxidized soybean oil, and 0.1 part by weight of a Ca-Zn type stabilizer, pelletizing the resultant mixture, and molding the pellets by the tubular film process. A blood-collecting type blood platelet triple bag having an inner volume of 400 ml was made by subjecting the sheet to high-frequency fusion. The blood platelet bag was internally wetted with an anticoagulant CPD liquid (a mixed liquid consisting of sodium citrate, citric acid, grape sugar, and sodium phosphate) and sterilized with high-pressure steam, to obtain a sample. The surface roughness, $R_{max}$, of the bag determined by the DIN Standard was 45 μm. The ratio, $(Rz_{max}-Rz_{min})/Rz_{max}$, of the bag was 25%. The inner wall surface was substantially flat and smooth in a 100-magnification SEM picture image and substantially flat and smooth again in a 3,000-magnification SEM picture image.

The blood platelet preserving bags obtained in the preceding examples were similarly tested for β-TG release, blood platelet preserving ability, and susceptibility to the phenomenon of blocking during the course of sterilization. The results were as shown in Table 1.

TABLE 1

|  | Example 1 (%) | Control 1 (%) | Example 2 (%) | Control 2 (%) |
| --- | --- | --- | --- | --- |
| β-TG release | 29.3 ± 10.5 | 24.5 ± 6.8 | 22.0 ± 7.2 | 45.3 ± 7.3 |
| Blood platelet preserving ability | good | good | good | no good |
| Susceptibility | 0 | 1 | 0 | 0 |

TABLE 1-continued

|  | Example 1 (%) | Control 1 (%) | Example 2 (%) | Control 2 (%) |
| --- | --- | --- | --- | --- |
| to blocking |  |  |  |  |

In the test for β-TG release (the amount of β-TG released during the disintegration of preserved blood platelet cells, a criterion for the evaluation of blood platelet preserving ability), the samples of Example 1 and Example 2 and the sample of Control 1 having an exclusively specular surface showed equal values. This fact indicates that the blood platelet bags of this invention, though possessing a rough surface, exhibited preservability substantially equal to the bag of a specular surface. Comparison of the results of the samples of this invention with those of the sample of Control 2 clearly reveals that the sample for comparison (Control 2), owing to particle diameters exceeding the range specified by the present invention, proved to be rejectable as involving a large β-TG release and exhibiting a poor blood platelet preserving ability.

By using a polyvinyl chloride resin composition containing 1 to 30% by weight, based on the total amount of vinyl chloride resin component, of cross-linked polyvinyl chloride resin particles of diameters approximately in the range of 2 to 30 μm, this invention permits the film contemplated to be formed by the tubular film process or the blow molding process without entailing the possibility of entraining foreign particles and without requiring use of any expensive embossing rolls. Since the produced film acquires a prescribed surface roughness, the blood platelet preserving container made of the film enjoys an outstanding blood platelet preserving ability.

Specifically, this invention produces a conspicuous technical effect of:

Firstly providing a blood platelet preserving container exhibiting a highly satisfactory blood platelet preserving ability, suffering from the disintegration of blood platelets only springly, precluding the phenomenon of blocking during the course of sterilization, retaining the quality of material for preserving container intact, and entailing no possibilty of entrainment of foreign particles, and Secondly providing a blood platelet preserving container capable of being fabricated by the tubular film process or the blow molding process which is convenient and easy to operate.

What is claimed is:

1. A blood platelet preserving container formed of a flexible vinyl chloride resin composition containing 1 to 30% by weight, based on the total amount of vinyl chloride resin component, of cross-linked vinyl chloride resin particles having an average diameter in the range of 2 to 30 μm and provided on the inner wall surface thereof with minute protuberances, wherein the inner wall surface is substantially rough as seen in a 100-magnification SEM picture image and substantially flat and smooth as seen in a 3,000-magnification SEM picture image and the inner wall surface has a roughness, $R_{max}$ (DIN Standard), in the range of 5 to 30 μm, and wherein the roughness of the inner wall surface is such that the ratio, $(Rz_{max}-Rz_{min})/Rz_{max}$, expressed with the values determined by the DIN Standard 4768 is not more than 30%.

2. A blood platelet preserving container according to claim 1, wherein the $R_{max}$ (DIN Standard) is in the range of 10 to 25 μm.

3. A blood platelet preserving container according to claim 1, wherein the ratio $(Rz_{max}-Rz_{min})/Rz_{max}$ is not more than 20%.

4. A blood platelet preserving container according to claim 1, wherein said cross-linked vinyl chloride resin particles have an average diameter in the range of 5 to 18 μm.

5. A blood platelet preserving container according to claim 1, wherein said flexible vinyl chloride resin composition contains a plasticizer in an amount in the range of 20 to 100 parts by weight, based on 100 parts by weight of the total amount of uncross-linked vinyl chloride resin.

6. A blood platelet preserving container according to claim 1, wherein said cross-linked vinyl chloride resin particles are contained in said flexible vinyl chloride resin composition in an amount in the range of 2 to 10% by weight, based on the total amount of vinyl chloride resin component.

7. A blood platelet preserving container according to claim 1, wherein said cross-linked vinyl chloride resin particles have an average diameter in the range of 3 to 20 μm.

8. A blood platelet preserving container according to claim 1, wherein said container is made of a sheetlike material.

* * * * *